Patented June 1, 1948

2,442,339

UNITED STATES PATENT OFFICE 2,442,339

SULFONIUM SALTS

Edgar C. Britton, Midland, Mich., and John N. Hansen, Albert Lea, Minn., assignors to The Dow Chemical Company, Midland, Mich., a corporation of Delaware No Drawing. Application April 10, 1946, Serial No. 661,071

7 Claims. (Cl. 260—457)

This invention relates to new sulfonium compounds and particularly to those comprising a hydrocarbon-substituted halophenoxy-polyalkylene ether grouping.

A wide variety of materials have been suggested for use as bactericides, antiseptics, and fungicides. These substances vary greatly with respect to their physical and chemical properties. Some are objectionable because of odor, instability, toxicity, or tendencies to irritate the skin of humans when contacted therewith. Others have solubility characteristics which make their use in aqueous compositions impractical, except as they may be employed in combination with excessive amounts of wetting, dispersing, or solubilizing agents. Still other compounds have relatively high vapor pressures, whereby they volatilize from compositions in which they are employed or out of contact with the surfaces to which they are applied, so that extended protection against micro-organisms is not obtained.

The new compounds of the present invention are characterized by a fortunate combination of properties whereby they are adequately soluble in water, of high germicidal and bactericidal effectiveness, substantially odorless, of low volatility, stable, and relatively non-irritating to the skin of humans and higher animals. These compounds have been found valuable for the control of micro-organisms.

One method for the preparation of the compounds of the present invention includes condensing a phenol with a suitable dihalo-polyalkylene ether in the presence of sodium hydroxide to form a compound of the formula

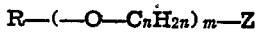

wherein R is a hydrocarbon-substituted halophenyl radical, Z represents halogen, and $m$ and $n$ are each an integer from 2 to 4, inclusive. Such product is then reacted with a suitable sodium mercaptide to form a sulfide of the formula

wherein R, $m$ and $n$ have the values set forth above. Such sulfide is then reacted with a suitable alkyl ester and preferably an ester of an inorganic acid, to give a sulfonium compound of the formula

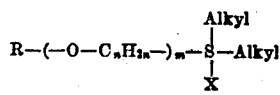

wherein R represents a hydrocarbon-substituted halophenyl radical, $m$ and $n$ are each an integer from 2 to 4, inclusive, and X represents a monobasic acid radical. The expression "alkyl" refers particularly to radicals containing from 1 to 18 carbon atoms, inclusive.

The preferred embodiments of the present invention include compounds of the foregoing formula in which R represents a hydrocarbon-substituted halophenyl structure of the formula

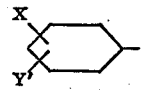

Here Y represents halogen, and Y' represents phenyl, cycloalkyl, or alkyl. These compounds are particularly suited for use in bactericidal and antiseptic compositions. Other preferred features of the generic structure as set forth above include compounds in which the polyalkylene ether grouping consists of a plurality of ethoxy radicals and preferably 2, and in which one of the hydrocarbon radicals attached to sulphur is methyl. The preferred halogen represented by Y is chlorine.

The following examples illustrate the invention but are not to be construed as limiting.

Example 1

310 grams (1 mole) of beta-[beta-($x$-monochloro-2-xenoxy)-ethoxy]-ethyl chloride, 90 grams (1 mole) of normal-butyl mercaptan, 40 grams (1 mole) of sodium hydroxide, 75 milliliters of water, and 800 milliliters of ethanol were mixed and reacted together for 12 hours at the boiling temperature of the mixture and under reflux. As the product from this reaction there was obtained 360 grams of normal-butyl beta-[beta-($x$-monochloro-2-xenoxy)-ethoxy]-ethyl sulfide as a light viscous oil, very soluble in benzene, and difficultly soluble in water.

360 grams (0.998 mole) of this sulfide and 126 grams (1 mole) of dimethyl sulfate were mixed together. Considerable heat of reaction was evolved and the mixture was allowed to stand at room temperature for 18 hours. The resulting crude product was warmed on a steam bath, dissolved in approximately 150 milliliters of absolute alcohol, and cooled. The solution was then diluted with diethyl ether to throw out normal-butyl methyl beta-[beta-($x$-monochloro-2-xenoxy)-ethoxy]-ethyl sulfonium methosulfate as a viscous light colored oil. This purification step with ethanol and ether was repeated several times and the ultimate residue warmed under reduced pressure to remove traces of solvent. The desired sulfonium compound was thereby obtained as a relatively viscous oil, readily soluble in water, ethanol, and benzene, and difficultly soluble in diethyl ether.

Example 2

49.15 grams (0.1 mole) of the sulfonium methosulfate salt as described in the preceding example was dissolved in 200 milliliters of water. A solution of 16 grams (0.1 mole) of sodium salicylate in 75 milliliters of water was added to the sulfonium salt solution with stirring. A clear straw-colored oil separated from solution and was recovered by extraction with ethylene chloride. The solvent was evaporated off to obtain 51 grams of normalbutyl methyl beta-[beta-($x$-monochloro-2-xenoxy)-ethoxy]-ethyl sulfonium salicylate as a viscous oil having a strong odor of wintergreen, soluble in ethanol, ethyl ether, and benzene, and relatively insoluble in water, petroleum ether, and carbon tetrachloride.

Example 3

Other sulfonium salt compounds which may be prepared substantially as described in the foregoing examples include the following:

Isopropyl secondaryoctyl delta-[delta-(2-cyclohexyl-4-chlorophenoxy)-normalbutoxy]-normalbutyl sulfonium iodide by reacting secondaryoctyl delta - [delta - (2 - cyclohexyl-4-chlorophenoxy) - normalbutoxy]-normalbutyl sulfide with isopropyl iodide.

Ethyl methyl beta-[beta-(beta-(2-chloro-4-tertiary - butyl-phenoxy)-ethoxy)-ethoxy]-ethyl sulfonium ethylsulfate by reacting methyl beta-[beta - (beta - (2 - chloro-4-tertiary-butyl - phenoxy)-ethoxy)-ethoxy]-ethyl sulfide with diethyl sulfate.

Dimethyl beta - [beta - (beta-(beta - (2 - cyclohexyl - 4 - bromophenoxy) - ethoxy) - ethoxy)-ethoxy]-ethyl sulfonium bromide by reacting together methyl beta - [beta - (beta-(beta-2-cyclohexyl - 4 - bromophenoxy) - ethoxy) - ethoxy)-ethoxy]-ethyl sulfide and methyl bromide.

Ethyl secondarybutyl gamma - [gamma - (4-chloro-2-cyclohexyl - phenoxy)-normalpropoxy]-normalpropyl sulfonium chloride by reacting secondarybutyl gamma-[gamma-(4-chloro-cyclohexyl - phenoxy) - normalpropoxy]-normalpropyl sulfide with ethyl chloride.

Methyl normaloctadecyl beta-[beta-(4-bromo-2 - normaloctyl - phenoxy)-propoxy]-propyl sulfonium bromide by reacting methyl beta-[beta-(4 - bromo - 2 - normaloctyl-phenoxy) - propoxy]-propyl sulfide with normaloctadecyl bromide.

Methyl normalpropyl beta-[beta-(2-iodo-4-methyl-phenoxy)-ethoxy]-ethyl sulfonium bromide by reacting methyl bromide with normalpropyl beta - [beta-(2-iodo-4-methyl - phenoxy)-ethoxy]-ethyl sulfide.

Methyl normalbutyl beta-[beta-(2-lauryl-4-chloro-phenoxy)-ethoxy]-ethyl sulfonium methosulfate by reacting normalbutyl beta-[beta-(2-lauryl-4-chloro-phenoxy)-ethoxy] ethyl sulfide with dimethyl sulfate.

The present application is a continuation-in-part of a copending application Serial Number 569,933, filed December 26, 1944, which has matured into Patent No. 2,417,057, granted March 11, 1947.

We claim:
1. A sulfonium compound having the formula

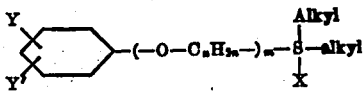

wherein Y represents halogen, Y' represents one of the group consisting of phenyl, cycloalkyl, and alkyl radicals, $m$ and $n$ are each an integer from 2 to 4, inclusive, and X represents a mono-basic acid radical.

2. A sulfonium compound having the formula

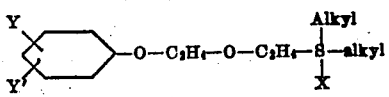

wherein Y represents halogen, Y' represents one of the group consisting of phenyl, cycloalkyl, and alkyl radicals, and X represents a mono-basic acid radical.

3. A sulfonium compound having the formula

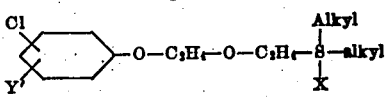

wherein Y' represents one of the group consisting of phenyl, cycloalkyl, and alkyl radicals, and X represents a mono-basic acid radical.

4. A sulfonium compound having the formula

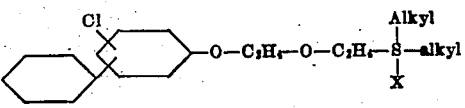

wherein X represents a mono-basic acid radical.

5. A sulfonium compound having the formula

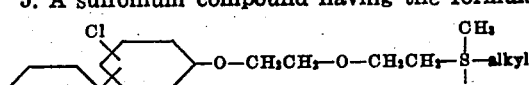

wherein X represents a mono-basic acid radical.

6. A sulfonium compound having the formula

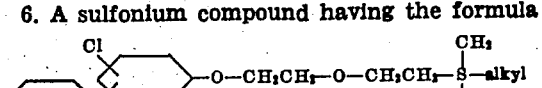

7. Normalbutyl methyl beta-[beta-($x$-monochloro-2-xenoxy)-ethoxy]-ethyl sulfonium methosulfate.

EDGAR C. BRITTON.
JOHN N. HANSEN.

REFERENCES CITED

The following references are of record in the file of this patent:

UNITED STATES PATENTS

| Number | Name | Date |
|---|---|---|
| 2,107,366 | Bruson | Feb. 8, 1938 |
| 2,121,823 | Piggott | June 28, 1938 |
| 2,204,976 | Van Peski et al. | June 18, 1940 |

FOREIGN PATENTS

| Number | Country | Date |
|---|---|---|
| 810,437 | France | Dec. 28, 1936 |

Certificate of Correction

Patent No. 2,442,339.  June 1, 1948.

EDGAR C. BRITTON ET AL.

It is hereby certified that errors appear in the printed specification of the above numbered patent requiring correction as follows: Column 2, line 9, in the formula, for "X" read $Y$; column 4, line 43, for "$CH_2$" read $CH_3$; and that the said Letters Patent should be read with these corrections therein that the same may conform to the record of the case in the Patent Office.

Signed and sealed this 12th day of October, A. D. 1948.

[SEAL]

THOMAS F. MURPHY,
*Assistant Commissioner of Patents.*